US012388543B2

(12) United States Patent
Li et al.

(10) Patent No.: US 12,388,543 B2
(45) Date of Patent: Aug. 12, 2025

(54) OPTIMIZATION METHOD FOR RESOURCE ALLOCATION IN PERCEPTION-ENHANCED COGNITIVE RADIO NETWORK BASED ON IRS

(71) Applicant: Nanjing University of Posts and Telecommunications, Jiangsu (CN)

(72) Inventors: Fei Li, Jiangsu (CN); Xiangling Guo, Jiangsu (CN); Ting Li, Jiangsu (CN); Shaocong Wu, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 0 days.

(21) Appl. No.: 18/832,106

(22) PCT Filed: Apr. 7, 2024

(86) PCT No.: PCT/CN2024/086290
§ 371 (c)(1),
(2) Date: Jul. 23, 2024

(87) PCT Pub. No.: WO2024/125675
PCT Pub. Date: Jun. 20, 2024

(65) Prior Publication Data
US 2025/0132847 A1    Apr. 24, 2025

(30) Foreign Application Priority Data

May 9, 2023 (CN) .......................... 202310515169.X

(51) Int. Cl.
*H04B 17/382* (2015.01)
*H04W 24/02* (2009.01)

(52) U.S. Cl.
CPC .......... *H04B 17/382* (2015.01); *H04W 24/02* (2013.01)

(58) Field of Classification Search
CPC ............................. H04B 17/382; H04B 24/02
See application file for complete search history.

(56) References Cited

U.S. PATENT DOCUMENTS

2024/0267088 A1*   8/2024   Yang .................. H04B 7/04013

FOREIGN PATENT DOCUMENTS

| CN | 113315547 | 8/2021 |
|---|---|---|
| CN | 114726414 | 7/2022 |

(Continued)

OTHER PUBLICATIONS

Dong Zhanqi et al., "Study on Spectrum Sensing for Transmission Phase in Cognitive Radio", Advanced Engineering Sciences, Jan. 2018, submit with English abstract, pp. 120-124.

(Continued)

*Primary Examiner* — Sulaiman Nooristany
(74) *Attorney, Agent, or Firm* — JCIPRNET

(57) ABSTRACT

Disclosed is an optimization method for resource allocation in a perception-enhanced cognitive radio network based on an IRS (intelligent reflecting surface). The method includes: acquiring BS (base station)-to-IRS and IRS-to-user channel state information; defining diagonal phase-shift matrices of the IRS in perception stage and transmission stage, and establishing an optimization model according to the channel state information; using the optimization model to optimize that the diagonal phase-shift matrix of the IRS in the perception stage assists the secondary base station (SBS) in perceiving a spectrum occupancy of a primary network; entering the transmission stage, and using the optimization model to optimize beamforming vectors of the SBS and the diagonal phase-shift matrices of the IRS in the transmission stage in the case of different perception results; transmitting transmission information according to optimization results (Continued)

to achieve an improvement in a spectrum efficiency of a system when constraints interfere with primary users.

6 Claims, 5 Drawing Sheets

(56) References Cited

FOREIGN PATENT DOCUMENTS

| | | |
|---|---|---|
| CN | 114765785 | 7/2022 |
| CN | 114828258 | 7/2022 |
| CN | 116233897 | 6/2023 |
| WO | 2022121497 | 6/2022 |

OTHER PUBLICATIONS

"International Search Report (Form PCT/ISA/210) of PCT/CN2024/086290," mailed on Apr. 18, 2024, with English translation thereof, pp. 1-6.

"Written Opinion of the International Searching Authority (Form PCT/ISA/237) of PCT/ CN2024/086290," mailed on Apr. 18, 2024, with English translation thereof, pp. 1-8.

\* cited by examiner

OPTIMIZATION METHOD FOR RESOURCE ALLOCATION IN PERCEPTION-ENHANCED COGNITIVE RADIO NETWORK BASED ON IRS

CROSS-REFERENCE TO RELATED APPLICATION

This application is a 371 of international application of PCT application serial no. PCT/CN2024/086290, filed on Apr. 7, 2024, which claims the priority benefits of China application serial no. 202310515169.X, filed on May 9, 2023. The entirety of the above-mentioned patent application is hereby incorporated by reference herein and made a part of this specification.

TECHNICAL FIELD

The present invention belongs to the technical field of wireless communication, and particularly relates to an optimization method for resource allocation in a perception-enhanced cognitive radio network based on an IRS.

BACKGROUND

Cognitive radio (CR) networks can authorize secondary network users to use unlicensed spectrum resources in the premise of ensuring the QOS (quality of service) constraints of primary network users, thereby improving the spectrum utilization. The access modes of a secondary network mainly include opportunistic access, a spectrum sharing and perception-enhanced spectrum sharing. The opportunistic access solution is intended to achieve that spectrum resources are used by secondary users (SUs) only when the spectrum resources are not used by primary users, although there is no interference to the primary users, the average transmission rate of the SUs is not high. The spectrum sharing solution is intended to achieve that SUs are authorized to use spectrum resources regardless of whether primary users uses them, but it is impossible to constrain the interference to the primary users and improve the transmission rate of the SUs at the same time. Perception enhancement can dynamically allocate powers in different situations according to perception results of a secondary base station (SBS), so as to maximize the transmission rate of SUs while ensuring the communication quality of primary users. Spectrum perception, as an important part of the opportunistic access mode and the perception-enhanced sharing, is the prerequisite for subsequent spectrum handover and spectrum sharing. Common spectrum detection methods include a matched filter method, a cyclostationary detection method and an energy detection method, where the matched filter method and the cyclostationary detection method require a large amount of prior knowledge of the primary network users, although the detection performance is good, the two methods are implemented complicatedly and have strong limitations. Energy detection is simple to implement, but it is sensitive to noise and is not suitable for use in low signal-to-noise ratio situations.

At present, some solutions have studied IRS-assisted cognitive radio systems: in a spectrum sharing mode, primary users will be interfered by SUs and thus the communication quality will be reduced, so in order to protect the communication of the primary users, a SBS has to reduce the transmit power to constrain interference, resulting in low rates of the SUs. In a perception-enhanced spectrum sharing mode, a secondary network perceives the usage of frequency bands to formulate different transmit strategies, and uses an intelligent reflecting surface (IRS) to assist in data transmission, which protects the QOS of primary users while increasing the rate of SUs. However, the IRS is not used in the perception stage to assist in perception, which results in waste of hardware resources and low perception performance.

SUMMARY OF INVENTION

An object of the present invention is to provide an optimization method for resource allocation in a perception-enhanced cognitive radio network based on an IRS to solve the problems raised in the above-mentioned background.

The object of the present invention is achieved in this way: an optimization method for resource allocation in a perception-enhanced cognitive radio network based on an IRS includes the following steps:

step S1: acquiring, by a SBS, BS-to-IRS and IRS-to-user channel state information;

step S2: defining IRS diagonal phase shift matrices in a perception stage and a transmission stage, and establishing an optimization model according to the channel state information;

step S3: using the optimization model to optimize that the IRS diagonal phase shift matrix in the perception stage assists the SBS in perceiving a spectrum occupancy of a primary network;

step S4: entering the transmission stage, and using the optimization model to optimize beamforming vectors of the SBS and the diagonal phase-shift matrices of the IRS in the transmission stage in the case of different perception results; and step S5: transmitting, by the SBS, transmission information according to optimization results to achieve an improvement in a spectrum efficiency of a system when constraints interfere with primary users.

Preferably, the defining diagonal phase-shift matrices of the IRS in a perception stage and a transmission stage in step S2 is specifically implemented as follows:

letting a reflection coefficient of the IRS in the perception stage be $\psi=[\psi_1, \ldots, \psi_M]^T \in \mathbb{C}^{M \times 1}$, $\psi_m = \alpha_m e^{j\omega_m}$, where $\alpha_m, \omega_m \in [0, 2\pi]$ is divided into a magnitude and a phase of a m-th element in the IRS, the diagonal phase shift matrix of the IRS in the perception stage is $\Psi = \text{diag}(\psi)$, a diag(x) function is defined to create a diagonal matrix whose diagonal elements are elements in x, and $\mathbb{C}^{M \times 1}$ represents a complex valued vector with a length of M+1; letting a reflection coefficient of the IRS in the transmission stage be $\phi=[\phi_1, \ldots, \phi_M]^T \in \mathbb{C}^{M \times 1}$, $\phi_m = \beta_m e^{j\theta_m}$, where $\beta_m, \theta_m \in [0, 2\pi]$ is divided into a magnitude and a phase of the m-th element in the IRS; the IRS diagonal phase shift matrix in the transmission stage is $\Phi = \text{diag}(\phi)$.

Preferably, establishing an optimization model in the step S2, an IRS-assisted perception-enhanced CR network model is selected as the optimization model; and perfect channel state information is acquired based on the SBS, and an optimization problem of the IRS-assisted perception-enhanced CR network model is expressed as:

$$\underset{w_{0,k},w_{1,k},\Phi,\Psi}{\text{maximize}} \; F(w_{0,k}, w_{1,k}, \Phi, \Psi) \triangleq (T-\tau) \sum_{k \in \mathcal{K}} \sum_{\Gamma=0}^{1} (a_\Gamma R_k^{0\Gamma} + b_\Gamma R_k^{1\Gamma}),$$

$$\text{s.t } C1: (T-\tau) \sum_{k \in \mathcal{K}} \sum_{\Gamma=0}^{1} (a_\Gamma + b_\Gamma)(|w_{\Gamma,k}|^2 + |w_{\Gamma,k}|^2) \leq P_{max}$$

$$C4: (T-\tau) \sum_{k \in \mathcal{K}} \left( b_0 |i_d^H w_{0,k} + i_r^H \Phi G w_{0,k}|^2 + b_1 |i_d^H w_{1,k} + i_r^H \Phi G w_{1,k}|^2 \right) \leq P_{tol}$$

$$C3: P_d = \overline{P}_d$$

$$C4: \Phi = \text{diag}(e^{j\phi_1}, \ldots, e^{j\phi_M})$$

$$C5: \Psi = \text{diag}(e^{j\psi_1}, \ldots, e^{j\psi_M})$$

where $P_{max}$ is a maximum transmit power of the SBS; $P_{tol}$ is a maximum interference that can be tolerated by a PU (primary user); $w_{0,k}$ is the SBS's beamforming for a k-th SU (secondary user) when a spectrum is idle; $w_{1,k}$ is the SBS's beamforming for the k-th SU when the spectrum is occupied; T is a duration of one communication frame; $\tau$ is a perception time of the SBS; T–$\tau$ is a SBS-to-SU transmission time in one communication frame; $\mathcal{K}$ is a user set, $\mathcal{K}=\{1,\ldots,K\}$; $\overline{P}_d$ is a constant detection probability; $i_d$ is a SUs-to-PU equivalent matrix; $i_r$ is an IRS-to-PU equivalent matrix; C1 is a total power constraint of the SBS, C2 limits an upper limit of interference received by PUs, C3 is a target detection probability constraint, C4 is a constraint of the diagonal phase shift matrix in the perception stage on the IRS, C5 is a constraint of the diagonal phase-shift matrix of the IRS in the transmission stage on the IRS.

Preferably, the using the optimization model to optimize that the diagonal phase-shift matrix of the IRS in the perception stage assists the SBS in perceiving a spectrum occupancy of a primary network in step S3 is specifically implemented as follows:

the diagonal phase-shift matrix of the IRS in the perception stage is $\Psi$, and an objective function and constraint conditions related to $\Psi$ are as follows:

$$\underset{\Psi}{\text{maximize}} \; (T-\tau) \sum_{k \in \mathcal{K}} \sum_{\Gamma=0}^{1} (a_\Gamma R_k^{0\Gamma} + b_\Gamma R_k^{1\Gamma})$$

$$\text{s.t } C1: (T-\tau) \sum_{k \in \mathcal{K}} \sum_{\Gamma=0}^{1} (a_\Gamma + b_\Gamma)(|w_{\Gamma,k}|^2 + |w_{\Gamma,k}|^2) \leq P_{max}$$

C5: $\Psi = \text{diag}(e^{j\psi_1}, \ldots, e^{j\psi_M})$, where an actual state of a $a_\Gamma R_k^{0\Gamma}$ rate is an idle state, an actual state of a $b_\Gamma R_k^{1\Gamma}$ rate is an occupied state; $w_{\Gamma,k}$ is the SBS's beamforming for the k-th SU when the spectrum is idle or occupied;

in the formula $$\underset{\Psi}{\text{maximize}} \; (T-\tau) \sum_{k \in \mathcal{K}} \sum_{\Gamma=0}^{1} (a_\Gamma R_k^{0\Gamma} + b_\Gamma R_k^{1\Gamma}),$$

a part related to the $\Psi$ in the objective function is $a_0 R_k^{00} + a_1 R_k^{01}$, maximization of the objective function is to maximize $a_0 R_k^{00} + a_1 R_k^{01}$, specifically as follows:

$$a_0 R_k^{00} + a_1 R_k^{01} = Pr(H_0)(1 - P_f(\tau, \Psi)) R_k^{00} +$$
$$Pr(H_0) P_f(\tau, \Psi) R_k^{01}, P_f(\tau, \Psi) \text{ is a monotonically}$$
$$= Pr(H_0) \left( R_k^{00} + P_f(\tau, \Psi)(R_k^{01} - R_k^{00}) \right)$$

decreasing function of $\gamma(\Psi)$, an optimization objective can be transformed into:

$$\underset{\Psi}{\text{maximize}} \; \gamma(\Psi), \; \gamma(\Psi) = \frac{|g_{CD}^H w_{PB} + g_{CR}^H \Psi G_{PC} w_{PB}|^2}{\sigma_n^2},$$
$$\text{s.t } C1, C5$$

where $\gamma$ is a signal-to-noise ratio received from a PBS signal at the SBS in the perception stage; $g_{CR}$ and $G_{PC}$ are IRS-to-SBS and PBS-to-IRS equivalent matrices respectively; $g_{CD}$ is a PBS-to-SBS direct link, $\sigma_n^2$ represents a variance of additive white Gaussian noise, $w_{PB}$ is a beamforming vector of the PBS.

The objective function is non-convex, its closed-form solution is obtained using its special structure; a following inequality is constructed:

$$|g_{CD}^H w_{PB} + g_{CR}^H \Psi G_{PC} w_{PB}| \overset{(a)}{\leq} |g_{CR}^H \Psi G_{PC} w_{PB}| + |g_{CD}^H w_{PB}|,$$

(a) is a triangle inequality established only when arg $(g_{CR}^H \Psi G_{PC} w_{PB}) = \arg(g_{CD}^H w_{PB}) \triangleq \varphi_0$; it is proved that there is always a solution $\psi$ satisfying (a) and the constraint C5; let $g_{CR}^H \Psi G_{PC} w_{PB} = v^H a$, $v = [e^{j\psi_1}, \ldots, e^{j\psi_M}]^H$, $a = \text{diag}(g_{CR}^H) G_{PC} w_{PB}$; the formula $$\underset{\Psi}{\text{maximize}} \; \gamma(\Psi)$$
$$\text{s.t } C1, C5$$

is made to be equivalent to:

$$\underset{v}{\text{maximize}} \; |v^H a|^2$$
$$\text{s.t. } |v_n| = 1, \forall n = 1, \ldots M,$$
$$\arg(v^H a) = \varphi_0$$

$v_n$ is a n-th element in $v$; its optimal solution is $v^* = e^{j(\varphi_0 - \arg(a))} = e^{j(\varphi_0 - \arg(\text{diag}(g_{CR}^H) G_{PC} w_{PB}))}$, an n-th optimized phase of the IRS is:

$\psi_n^* = \varphi_0 - \arg(g_{n,CR}^H g_n^H w_{PB})$, where $g_{n,CR}^H$ is a n-th element of $g_{CR}^H$, $g_n^H$ is a vector in an n-th row of $G_{PC}$; the optimization of the IRS phase $\Psi$ in the perception stage is completed.

Preferably, entering the transmission stage in the step S4, using the optimization model to optimize beamforming vectors of the SBS and the IRS diagonal phase-shift matrix $\Phi$ in the transmission stage in the case of different perception results is specifically implemented as follows:

step S4-1: optimizing the beamforming vectors of the SBS; obtaining an optimal solution of the beamforming vectors of the SBS through successive convex optimization and positive semi-definite programming;

step S4-2: optimizing the diagonal phase-shift matrix Φ of the IRS in the transmission stage; transforming an optimization problem into a convex optimization problem through successive convex optimization and Gaussian randomization, performing solving by a convex optimization (CVX) toolbox, iterating until the optimization problem converges.

Preferably, the optimizing the beamforming vectors of the SBS in the step S4-1 is specifically implemented as follows:

defining $W_{\Gamma,k} = w_{\Gamma,k} w_{\Gamma,k}^H$, for a given Φ, expressing an optimization problem for a beamforming matrix $W_{\Gamma,k}$ as follows:

$$\underset{W_{\Gamma,k} \in \mathbb{H}^{N_T}}{\text{maximize}} (T-\tau) \sum\nolimits_{k \in \mathcal{K}} \sum\nolimits_{\Gamma=0}^{1} (a_\Gamma R_k^{0\Gamma} + b_\Gamma R_k^{1\Gamma}),$$

s.t  C1:$(T-\tau)\Sigma_{k \in \mathcal{K}} \Sigma_{\Gamma=0}^1 (a_\Gamma \text{Tr}(W_{\Gamma,k}) + b_\Gamma \text{Tr}(W_{\Gamma,k}) \leq P_{max}$, C6:$W_{\Gamma,k} \succeq 0$, $\forall k$, $\Gamma \in \{0,1\}$, C7:Rank$(W_{\Gamma,k}) \leq 1$, $\forall k$, $\Gamma \in \{0,1\}$, $\mathbb{H}^{N_T}$ indicates a set matrix of $N_T$-dimensional plural Hermite, constraints C6 and C7 ensure that $W_{\Gamma,k}$ is decomposed into $w_{\Gamma,k} w_{\Gamma,k}^H$; in order to ensure that $W_{\Gamma,k}$ can be decomposed into $w_{\Gamma,k}$, it is necessary to ensure $W_{\Gamma,k} \succeq 0$ and Rank$(W_{\Gamma,k}) \leq 1$, constraints C6:$W_{\Gamma,k} \succeq 0$, $\forall k$, $\Gamma \in \{0,1\}$, C7:Rank$(W_{\Gamma,k}) \leq 1$, $\forall k$, $\Gamma \in \{0,1\}$ are defined; under the influence of the objective function and the constraint C7, transforming the optimization problem into a convex optimization problem;

defining f and g as follows: $f(W_{\Gamma,k}, \sigma^2) = -\Sigma_{k \in \mathcal{K}} \log_2(\Sigma_{r \in \mathcal{K}} \text{Tr}(\tilde{h}_k \tilde{h}_k^H W_{\Gamma,r}) + \sigma^2)$, $g(W_{\Gamma,k}, \sigma^2) = -\Sigma_{k \in \mathcal{K}} \log_2(\Sigma_{r \in \mathcal{K} \setminus \{k\}} \text{Tr}(\tilde{h}_k \tilde{h}_k^H W_{\Gamma,r}) + \sigma^2)$, where $\mathcal{K} \setminus \{k\}$ represents a set of $\mathcal{K}$ in which an element k is removed.

For any feasible $W^{(j)}$, constructing a global lower limit of g(W):

$$g(W_{\Gamma,k}, \sigma^2) \geq g(W_{\Gamma,k}^{(j)}, \sigma^2) +$$

$$\sum_{k \in \mathcal{K}} Tr\left( (\nabla_W g(W_{\Gamma,k}^{(j)}, \sigma^2))^H (W_{\Gamma,k}, W_{\Gamma,k}^{(j)}) \right) \triangleq \hat{g}(W_{\Gamma,k}, W_{\Gamma,k}^{(j)}, \sigma^2),$$

where $\nabla_{W_k} g(W_{\Gamma,k}, \sigma^2) = -\frac{1}{\ln 2} \frac{\tilde{h}_r \tilde{h}_r^H}{\sum_{r \in \mathcal{K} \setminus \{k\}} Tr(\tilde{h}_r \tilde{h}_r^H W_k) + \sigma^2}$ For any feasible $W_{\Gamma,k}^{(j)}$, $\Gamma \in \{0,1\}$, transforming the optimization problem into:

$$\underset{w_{0,k}, w_{1,k}}{\text{minimize}} \sum_{\Gamma=0}^{1} (a_\Gamma (f(W_{\Gamma,k}, \sigma^2) - \hat{g}(W_{\Gamma,k}, W_{\Gamma,k}^{(j)}, \sigma_n^2) +$$

$$b_\Gamma (f(W_{\Gamma,k}, \sigma_n^2 + \sigma_p^2) - \hat{g}(W_{\Gamma,k}, W_{\Gamma,k}^{(j)}, \sigma_n^2 + \sigma_p^2)))$$

s.t. C1, $\widetilde{C2}$, C6, C7.

Preferably, optimizing the diagonal phase-shift matrix Φ of the IRS in the transmission stage in the step S4-2 is specifically implemented as follows:

For given $w_{0,k}$ and $w_{1,k}$, a phase design problem of the IRS in the transmission stage is as follows:

$$\underset{\Phi}{\text{maximize}} (T-\tau) \sum\nolimits_{k \in \mathcal{K}} \sum\nolimits_{\Gamma=0}^{1} (a_\Gamma R_k^{0\Gamma} + b_\Gamma R_k^{1\Gamma}),$$

s.t  $C2:(T-\tau) \sum\nolimits_{k \in \mathcal{K}} (b_0 |i_d^H w_{0,k} + i_r^H \Phi G w_{0,k}|^2 +$
$$b_1 |i_d^H w_{1,k} + i_r^H \Phi G w_{1,k}|^2) \leq P_{tol},$$

$C4: \Phi = \text{diag}(e^{j\phi_1}, \ldots, e^{j\phi_M})$

An objective function and a constraint C4 of the optimization problem are non-convex functions, the objective function is processed:

$$|h_k^H w_{\Gamma,r} + h_{R,k}^H \Phi G w_{\Gamma,r}|^2$$

$$= Tr\left( [\theta^H \rho *] \begin{bmatrix} \text{diag}(h_{R,k}^H) G \\ h_k^H \end{bmatrix} W_{\Gamma,k} [G^H \text{diag}(h_{R,k}^H) \, h_k^H] \begin{bmatrix} \theta \\ \rho \end{bmatrix} \right)$$

$$= Tr(\tilde{\theta}^H H_k W_{\Gamma,k} H_k^H \tilde{\theta})$$

$$= Tr(\Theta H_k W_{\Gamma,k} H_k^H)$$

where optimization variables $\theta \in \mathbb{C}^{M \times 1}$, $\tilde{\theta} \in \mathbb{C}^{(M+1) \times 1}$ and $\Theta \in \mathbb{C}^{(M+1) \times (M+1)}$ are respectively defined as: $\theta = [e^{j\phi_1}, \ldots, e^{j\phi_M}]^H$, $\tilde{\theta} = [\theta^T \, \rho]^T$, $\Theta = \tilde{\theta}\tilde{\theta}^H$, where $\rho \in \mathbb{C}$ is a dummy variable and $|\rho|=1$, $H_k = [(\text{diag}(h_{R,k}^H)G)^T h^*_k]^T$; a rate at a k-th user is equivalent to the following form:

$$R_k^{0\Gamma} = \log_2 \left( 1 + \frac{Tr(\Theta H_k W_{\Gamma,k} H_k^H)}{\sum_{r \in \mathcal{K} \setminus \{k\}} Tr(\Theta H_k W_{\Gamma,r} H_k^H) + \sigma_n^2} \right),$$

$$R_k^{0\Gamma} = \log_2 \left( 1 + \frac{Tr(\Theta H_k W_{\Gamma,k} H_k^H)}{\sum_{r \in \mathcal{K} \setminus \{k\}} Tr(\Theta H_k W_{\Gamma,r} H_k^H) + \sigma_p^2 + \sigma_n^2} \right),$$

a constraint C2 is transformed into:

$$\widetilde{C2}: (T-\tau) \sum\nolimits_{k \in \mathcal{K}} \sum\nolimits_{\Gamma=0}^{1} b_\Gamma Tr(\Theta L W_{\Gamma,r} L^H) \leq p_{tol},$$

where $L \in \mathbb{C}^{(M+1) \times N_T}$, $L = [(\text{diag}(i_r^H) G)^T \, i_d^*]^T$;

For the non-convex objective functions, following definitions are given:

$$\tilde{f}(\Theta, m, \Gamma) = -\sum\nolimits_{k \in \mathcal{K}} \log_2 \left( \sum\nolimits_{r \in \mathcal{K}} Tr(\Theta H_k W_{\Gamma,r} H_k^H) + m\sigma_p^2 + \sigma_n^2 \right),$$

$$\tilde{g}(\Theta, m, \Gamma) = -\sum\nolimits_{k \in \mathcal{K}} \log_2 \left( \sum\nolimits_{r \in \mathcal{K} \setminus \{k\}} Tr(\Theta H_k W_{\Gamma,r} H_k^H) + m\sigma_p^2 + \sigma_n^2 \right),$$

therefore, the optimization problem is transformed into:

$$\underset{\Theta \in \mathbb{H}^{M+1}}{\text{minimize}} (T-\tau) \sum\nolimits_{\Gamma=0}^{1} (a_\Gamma (\tilde{f}(\Theta, 0, \Gamma) - \tilde{g}(\Theta, 0, \Gamma)) +$$

$$b_\Gamma (\tilde{f}(\Theta, 1, \Gamma) - \tilde{g}(\Theta, 1, \Gamma))),$$

-continued s.t. $\tilde{C2}$: $(T-\tau)\sum_{k\in\mathcal{K}}\sum_{\Gamma=0}^{1}b_{\Gamma}Tr(\Theta LW_{\Gamma,k}L^{H})\leq p_{tot}$, $\tilde{C4}$: $Diag(\Theta)=I_{M+1}$, C8: $\Theta\succeq 0$, C9: Rank($\Theta$)=1, where Diag($\Theta$) represents a diagonal matrix whose diagonal elements are extracted from a leading diagonal of $\Theta$. $I_{M+1}$ represents a M+1-order unit vector. Constraints C8: $\Theta\succeq 0$, C9: Rank($\Theta$)=1 are defined; the constraints C8 and C9 and $\Theta\in\mathbb{H}^{M+1}$ jointly ensure that $\Theta=\tilde{\theta}\tilde{\theta}^{H}$ remain unchanged after being optimized; and a rank-one solution is guaranteed by Gaussian randomization.

Compared with the prior art, the present invention has the following improvements and advantages: 1. By deploying an IRS to assist in spectrum perception, a false alarm probability can converge to 0 in a shorter perception time and at a lower transmit power, so as to facilitate the SBS to formulate different transmit strategies more precisely to improve the spectrum efficiency; at the same time, the IRS can assist a transmission process of the SBS to improve a channel environment and increase a sum rate of SUs.

2. Through a BCD optimization method, the phases of the IRS in the perception stage and the transmission stage and the beamforming of the SBS are optimized in sequence to increase a sum rate of incoming SUs; at the same time, it can still maintain a high sum rate at a lower noise threshold.

DESCRIPTION OF EMBODIMENTS

The present invention will be further summarized below with reference to the accompanying drawings.

Figure 1:
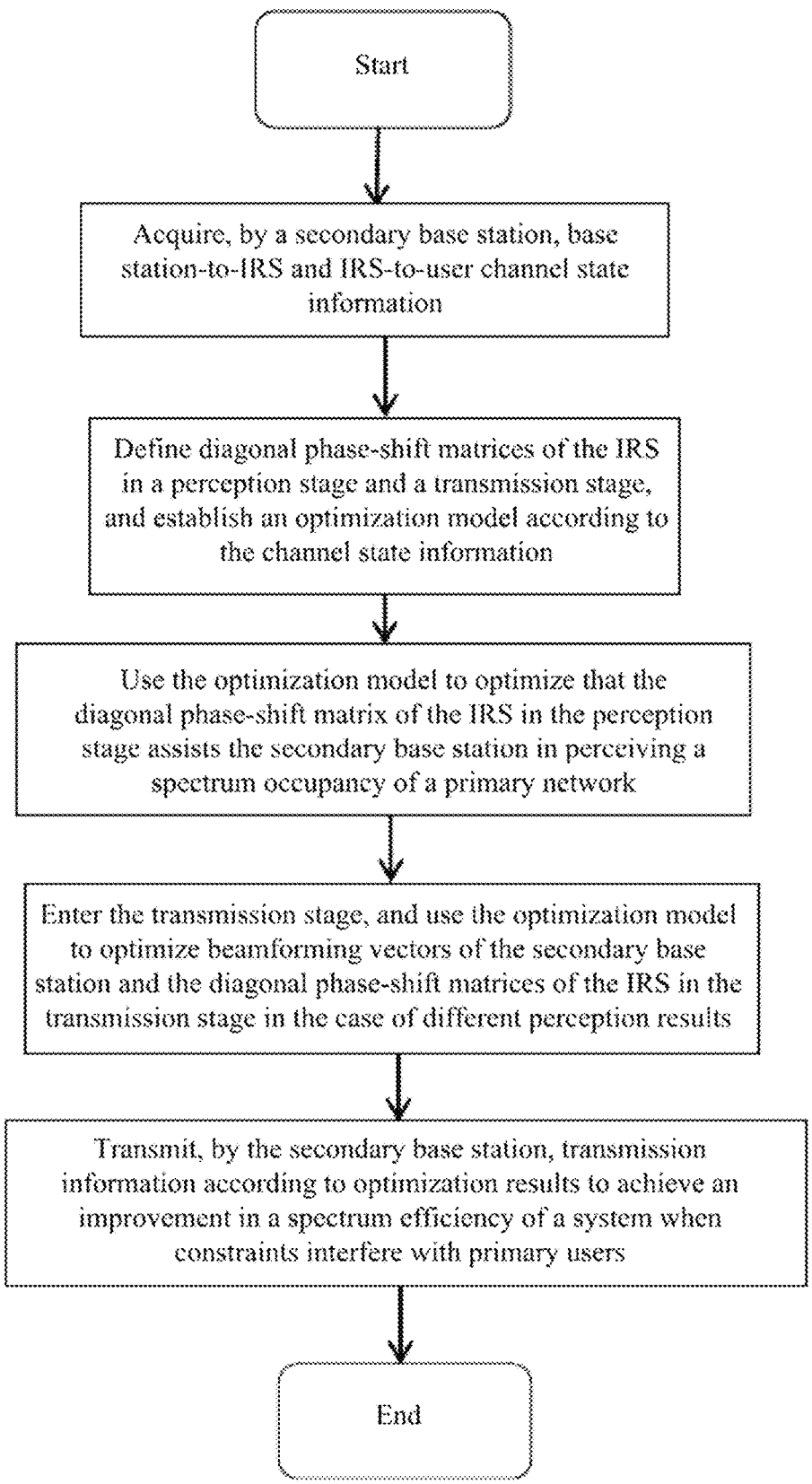
FIG. 1 is an overall flow diagram of the present invention.
Figure 2:
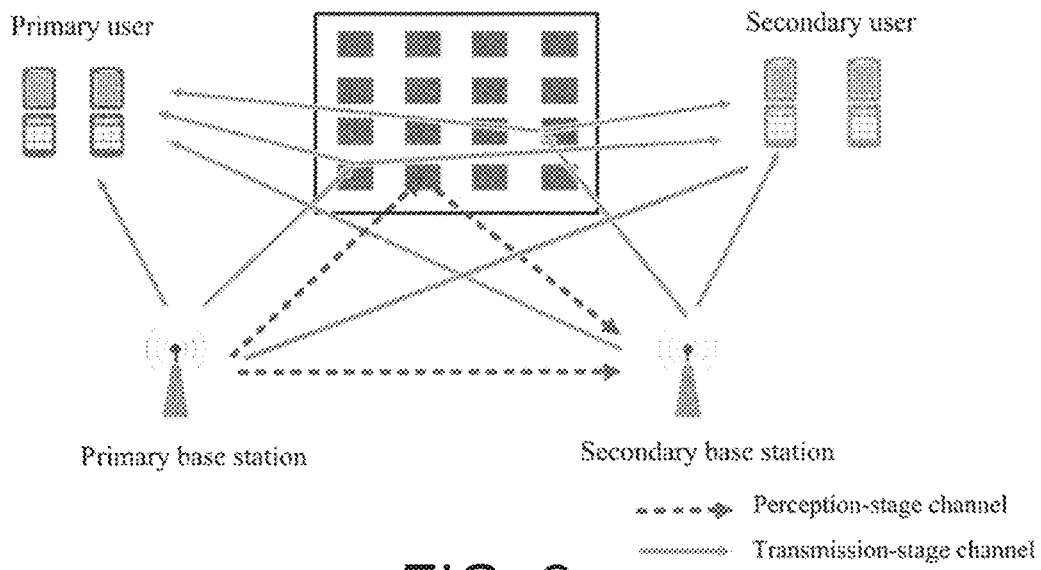
FIG. 2 is an overall system model diagram of the present invention.

As shown in FIGS. 1 and 2, there is provided an optimization method for resource
allocation in a perception-enhanced cognitive radio network based on an IRS, which includes the following steps:
  step S1: a SBS acquires BS-to-IRS and IRS-to-user channel state information;
  an IRS-assisted downlink perception-enhanced spectrum sharing cognitive radio system is established, the system mainly includes a licensed primary network and an unlicensed secondary network; the primary network includes a multi-antenna PBS and N single-antenna PUs, and the secondary network includes a multi-antenna SBS and K single-antenna SUs.

In order to improve the spectrum efficiency in the premise of ensuring the QoS of the primary network to the greatest extent, a perception-enhanced spectrum sharing mode is adopted. In order to ensure the QoS of the primary network, a constant detection probability $\bar{P}_d$ is considered, and a false alarm probability is $P_f(\tau)=Q(\sqrt{2\gamma+1}Q^{-1}(\bar{P}_d)+\sqrt{\tau f_s}\gamma)$, where $\gamma$ is a signal-to-noise ratio of a signal received from the PBS at the SBS in a perception stage, $f_s$ is a sampling frequency, and $Q^{-1}(\ )$ is a complementary error distribution function of standard Gaussian random variables; according to the method of the present invention, an IRS-assisted enhancement is performed on $\gamma$, then:

$$\gamma(\Psi) = \frac{|g_{CD}^H\sqrt{P} + g_{CR}^H\Psi G_{PC}\sqrt{P}|^2}{\sigma_n^2},$$

where P is a transmit power of the PBS, $\sigma_n^2$ represents a variance of additive white Gaussian noise, $x^H$ represents a transpose of x, representing $g_{CD}$ is a PBS-to-SBS direct link, $g_{CR}$ and $G_{PC}$ are IRS-to-SBS and PBS-to-IRS equivalent matrices, respectively; $\Psi$ is a diagonal phase shift matrix of the IRS in the perception stage, $\Phi$ is a diagonal phase shift matrix of the IRS in a transmission stage.

step S2: the diagonal phase-shift matrices of the IRS in the perception stage and the transmission stage are defined, an optimization model is established according to the channel state information;
  a reflection coefficient of the IRS in the perception stage be $\psi=[\psi_1,\ldots,\psi_M]^T\in\mathbb{C}^{M\times 1}$, $\psi_m=\alpha_m e^{j\omega_m}$; where $\alpha_m$, $\in[0,2\pi]$ is divided into a magnitude and a phase of a m-th element in the IRS, the diagonal phase-shift matrix of the IRS in the perception stage is $\Psi=\mathrm{diag}(\psi)$, a diag(x) function represents a diagonal matrix whose diagonal elements are elements in x, $\mathbb{C}^{M\times 1}$ represents a complex valued vector with a length of M+1. Let a reflection coefficient of the IRS in the transmission stage be $\phi=[\phi_1,\ldots,\phi_M]^T\in\mathbb{C}^{M\times 1}$, $\phi_m=\beta_m e^{j\theta_m}$; where $\beta_m$, $\theta_m\in[0,2\pi]$ is divided into a magnitude and a phase of the m-th element in the IRS; the diagonal phase-shift matrix of the IRS in the transmission stage is $\Phi=\mathrm{diag}(\phi)$.

A signal received by the k-th SU from the SBS is expressed as: $|h_k^H w_k + h_{R,k}^H \Phi G w_k|$, it is defined that $H_0$ indicates that a state of a frequency band of the primary network is idle, $H_1$ indicates that the state of the frequency band is occupied; $w_{0,k}$ is the SBS's beamforming for a k-th SU when a spectrum is idle, $w_{1,k}$ is the SBS's beamforming for the k-th SU when the spectrum is occupied, based on actual states of the frequency band and spectrum perception results of the SBS, achievable transmission rates of the SUs are as follows:

$$R_k^{0\Gamma} = \log_2\left(1 + \frac{|h_k^H w_{\Gamma,k} + h_{R,k}^H \Phi G w_{\Gamma,k}|^2}{\sum_{r\in\mathcal{K}\backslash\{k\}}|h_R^H w_{\Gamma,r} + h_{R,r}^H \Phi G w_{\Gamma,r}|^2 + \sigma_k^2}\right),$$

$$R_k^{1\Gamma} = \log_2\left(1 + \frac{|h_k^H w_{\Gamma,k} + h_{R,k}^H \Phi G w_{\Gamma,k}|^2}{\sum_{r\in\mathcal{K}\backslash\{k\}}|h_R^H w_{\Gamma,r} + h_{R,r}^H \Phi G w_{\Gamma,r}|^2 + \sigma_p^2 + \sigma_k^2}\right),$$

where $R_k^{0\Gamma}$ represents a transmission rate of the SBS and the k-th secondary network user when the frequency band is actually not occupied, $R_k^{1\Gamma}$ represents a transmission rate of the SBS and the k-th secondary network user when the frequency band is actually occupied; $\Gamma$ is a variable, $\Gamma$ being 0 indicates that the perception result of the SBS is that the frequency band is not occupied, $\Gamma$ being 1 indicates that the perception result of the SBS is that the frequency band is occupied; $w_{0,k}$ is the SBS's beamforming for the k-th SU when the spectrum is idle; $w_{1,k}$ is the SBS's beamforming for the k-th SU when the spectrum is occupied; $\sigma_k^2$ indicates a variance of additive white Gaussian noise at the k-th SU; $\sigma_p^2$ is noise from the PBS at the k-th SU; $h_{R,k}^H$ is a $k_{th}$-user-to-IRS equivalent matrix; $h_k^H$ is a baseband equivalent channel state of the k-th user; G is an IRS-to-SBS equivalent channel matrix; a user set is $\mathcal{K}$, $\mathcal{K}=\{1, \ldots, K\}$; $\mathcal{K} \backslash \{k\}$ represents a set of $\mathcal{K}$ in which an element k is removed.

where the transmission rate of the k-th SU has four corresponding probabilities expressed as:

$$a_0 = Pr(H_0)(1 - P_f(\tau, \Psi))$$
$$b_0 = Pr(H_1)(1 - \overline{P}_d)$$
$$a_1 = Pr(H_0) P_f(\tau, \Psi)$$
$$b_1 = Pr(H_1) \overline{P}_d$$

where $Pr(H_0)$ and $Pr(H_1)$ respectively represent probabilities that a channel of the PBS is idle and occupied; $a_0$ is a corresponding probability of occurrence of $R_k^{00}$; $b_0$ is a corresponding probability of occurrence of $R_k^{10}$; $a_1$ is a corresponding probability of occurrence of $R_k^{01}$; $b_1$ is the corresponding probability of occurrence of $R_k^{11}$; $P_f$ is a false alarm probability; $\overline{P}_d$ is a constant detection probability; therefore, an average sum rate of all SUs is: $R_{sum}=(T-\tau)\sum_{k\in\mathcal{K}}\sum_{\Gamma=0}^{1}(a_\Gamma R_k^{0\Gamma}+b_\Gamma R_k^{1\Gamma})$, where an actual state of a $a_\Gamma R_k^{0\Gamma}$ rate is an idle state, an actual state of a $b_\Gamma R_k^{1\Gamma}$ rate is an occupied state; $\tau$ is a perception time slot of the SBS, $T-\tau$ is a SBS-to-SU transmission time in one communication frame; $\Gamma$ is a variable, $\Gamma$ being 0 indicates that the perception result of the SBS is that the frequency band is not occupied, $\Gamma$ being 1 indicates that the perception result of the SBS is that the frequency band is occupied.

$i_d$ and $i_r$ are set to respectively represent SUs-to-PU and IRS-to-PU equivalent matrices. The interference to the PU generated by the shared spectrum SBS can be expressed as:

$$I = (T-\tau)\sum_{k\in\mathcal{K}}\left(b_0\left|i_d^H w_{0,k} + i_r^H \Phi G w_{0,k}\right|^2 + b_1\left|i_d^H w_{0,k} + i_r^H \Phi G w_{1,k}\right|^2\right),$$

where, $w_{0,k}$ indicates that the SBS provides beamforming with higher power for SUs; $w_{1,k}$ indicates that the SBS provides beamforming with less power for SUs.

Perfect channel state information is acquired based on the SBS, an optimization problem of an IRS-assisted perception-enhanced CR network model is expressed as:

$$\underset{w_{0,k},w_{1,k},\Phi,\Psi}{\text{minimize}}\ F(w_{0,k}, w_{1,k}, \Phi, \Psi) \triangleq (T-\tau)\sum_{k\in\mathcal{K}}\sum_{\Gamma=0}^{1}(a_\Gamma R_k^{0\Gamma} + b_\Gamma R_k^{1\Gamma}),$$

$$\text{s.t } C1: (T-\tau)\sum_{k\in\mathcal{K}}\sum_{\Gamma=0}^{1}(a_\Gamma + b_\Gamma)(|w_{\Gamma,k}|^2 + |w_{\Gamma,k}|^2) \leq P_{max},$$

$$C4: (T-\tau)\sum_{k\in\mathcal{K}}\left(b_0\left|i_d^H w_{0,k} + i_r^H \Phi G w_{0,k}\right|^2 + b_1\left|i_d^H w_{1,k} + i_r^H \Phi G w_{1,k}\right|^2\right) \leq P_{tol}, C3: P_d = \overline{P}_d,$$

$$C4: \Phi = \text{diag}\left(e^{j\phi_1}, \ldots, e^{j\phi_M}\right), C5: \Psi = \text{diag}\left(e^{j\psi_1}, \ldots, e^{j\psi_M}\right),$$

where $P_{max}$ is a maximum transmit power of the SBS; $P_{tol}$ is a maximum interference that can be tolerated by a PU; $w_{0,k}$ is the SBS's beamforming for a k-th SU when a spectrum is idle; $w_{1,k}$ is the SBS's beamforming for the k-th SU when the spectrum is occupied; T is a duration of one communication frame; $\tau$ is a perception time of the SBS; $T-\tau$ is a SBS-to-SU transmission time in one communication frame; $\overline{P}_d$ is a constant detection probability; $i_d$ is a SUs-to-PU equivalent matrix; $i_r$ is an IRS-to-PU equivalent matrix; C1 is a total power constraint of the SBS, C2 limits an upper limit of interference received by PUs, C3 is a target detection probability constraint, C4 is a constraint of the diagonal phase shift matrix in the perception stage, C5 is a constraint of the diagonal phase-shift matrix of the IRS in the transmission stage.

step S3: the optimization model is used to optimize that the diagonal phase-shift matrix $\Psi$ of the IRS in the perception stage assists the SBS in perceiving a spectrum occupancy of a primary network;

Specifically implemented as follows:

the diagonal phase-shift matrix of the IRS in the perception stage is $\Psi$, and an objective function and constraint conditions related to the $\Psi$ are as follows:

$$\underset{\Psi}{\text{minimize}}\ (T-\tau)\sum_{k\in\mathcal{K}}\sum_{\Gamma=0}^{1}\left(a_\Gamma R_k^{0\Gamma} + b_\Gamma R_k^{1\Gamma}\right),$$

$$\text{s.t } C1: (T-\tau)\sum_{k\in\mathcal{K}}\sum_{\Gamma=0}^{1}(a_\Gamma + b_\Gamma)\left(|w_{\Gamma,k}|^2 + |w_{\Gamma,k}|^2\right) \leq P_{max},$$

$$C5: \Psi = \text{diag}\left(e^{j\psi_1}, \ldots, e^{j\psi_M}\right)$$

as can be seen from the formula $$\underset{\Psi}{\text{maximize}}\ (T-\tau)\sum_{k\in\mathcal{K}}\sum_{\Gamma=0}^{1}\left(a_\Gamma R_k^{0\Gamma} + b_\Gamma R_k^{1\Gamma}\right),$$

a part related to the $\Psi$ in the objective function is $a_0 R_k^{00} + a_1 R_k^{01}$, maximization of the objective function is to maximize $a_0 R_k^{00} + a_1 R_k^{01}$, which is specifically as follows:

$$a_0 R_k^{00} + a_1 R_k^{01}$$
$$= Pr(H_0)(1 - P_f(\tau, \Psi)) R_k^{00} + Pr(H_0) P_f(\tau, \Psi) R_k^{01}$$
$$= Pr(H_0)\left(R_k^{00} + P_f(\tau, \Psi)\left(R_k^{01} - R_k^{00}\right)\right)$$

$P_f(\tau, \Psi)$ is a monotonically decreasing function of $\gamma(\Psi)$, an optimization objective can be transformed into:

$$\underset{\Psi}{\text{maximize}}\ \gamma(\Psi)$$
$$\text{s.t } C1, C5$$

$$\gamma(\Psi) = \frac{\left|g_{CD}^H w_{PB} + g_{CR}^H \Psi G_{PC} w_{PB}\right|^2}{\sigma_n^2},$$

where $\gamma$ is a signal-to-noise ratio of a signal received from the PBS at the SBS in the perception stage; $g_{CR}$ and $G_{PC}$ are IRS-to-SBS and PBS-to-IRS equivalent matrices, respectively; $g_{CD}$ is a PBS-to-SBS direct link, $\sigma_n^2$ represents a variance of additive white Gaussian noise, $w_{PB}$ is a beamforming vector of the PBS.

The objective function is non-convex, and its closed-form solution is obtained using its special structure; and a following inequality is constructed:

$$\left|g_{CD}^H w_{PB} + g_{CR}^H \Psi G_{PC} w_{PB}\right| \stackrel{(a)}{\leq} \left|g_{CR}^H \Psi G_{PC} w_{PB}\right| + \left|g_{CD}^H w_{PB}\right|,$$

(a) is a triangle inequality established only when arg$(g_{CR}^H G_{PC} w_{PB})$=arg$(g_{CD}^H w_{PB}) \triangleq \Phi_0$; it is proved that there is always a solution $\psi$ satisfying (a) and the constraint C5; let $g_{CR}^H \Psi G_{PC} w_{PB} = v^H a$, $v = [e^{j\psi_1}, \ldots, e^{j\psi_M}]^H$, a=diag($g_{CR}^H$)$G_{PC} w_{PB}$.

The formula $$\underset{\Psi}{\text{maximize}} \ \gamma(\Psi)$$
$$\text{s.t} \ C1, C5$$

is made to be equivalent to:

$$\underset{v}{\text{maximize}} \ |v^H a|^2$$
$$\text{s.t.} \ |v_n| = 1, \forall \ n = 1, \ldots M, v_n \text{ is a } n\text{-th element in } v.$$

$$\arg(v^H a) = \varphi_0$$

Its optimal solution is $v^* = e^{j(\varphi_0 - \arg(a))} = e^{j(\varphi_0 - \arg(\text{diag}(g_{CR}^H) G_{PC} w_{PB}))}$, an n-th optimized phase of the IRS is: $\psi_n^* = \varphi_0 - \arg(g_{n,CR}^H g_n^H w_{PB})$, where $g_{n,CR}^H$ is a n-th element of $g_{CR}^H$, $g_n^H$ is a vector in an n-th row of $G_{PC}$; and the optimization of the phase $\Psi$ of the IRS in the perception stage is completed.

step S4: the transmission stage enters, and the optimization model is used to optimize beamforming vectors of the SBS and the diagonal phase shift matrix $\Phi$ of the IRS in the transmission stage in the case of different perception results;

Specifically implemented as follows:

step S4-1: the beamforming vectors of the SBS are optimized; an optimal solution of the beamforming vectors of the SBS is obtained through successive convex optimization and positive semi-definite programming;

$W_{\Gamma,k} = w_{\Gamma,k} w_{\Gamma,k}^H$ is defined, for a given $\Phi$, $|h_k^H w_{r,k} + h_{R,k}^H \Phi G w_{r,k}|^2$ and $|i_d^H w_{r,k} + i_r^H \Phi G w_{\Gamma,k}|^2$ are rewritten:

$$|h_k^H w_{r,k} + h_{R,k}^H \Phi G w_{r,k}|^2 = \left|\tilde{h}_k^H w_{r,k}\right|^2 = Tr\left(\tilde{h}_k \tilde{h}_k^H W_{r,k}\right),$$

$$|i_d^H w_{r,k} + i_r^H \Phi G w_{\Gamma,k}|^2 = \left|\tilde{i}^H w_{\Gamma,k}\right|^2 = Tr\left(\tilde{i} \tilde{i}^H W_{r,k}\right)$$

where $\tilde{h}_k = h_k + G^H \Phi^H h_{r,k}$, $\tilde{i}_k = i_d + G^H \Phi^H i_r$, a rate of the k-th SU is rewritten as:

$$R_k^{0\Gamma} = \log_2\left(1 + \frac{Tr\left(\tilde{h}_k \tilde{h}_k^H W_{\Gamma,k}\right)}{\sum_{r \in \mathcal{K} \setminus \{k\}} Tr\left(\tilde{h}_k \tilde{h}_k^H W_{\Gamma,r}\right) + \sigma_n^2}\right)$$

$$R_k^{1\Gamma} = \log_2\left(1 + \frac{Tr\left(\tilde{h}_k \tilde{h}_k^H W_{\Gamma,k}\right)}{\sum_{r \in \mathcal{K} \setminus \{k\}} Tr\left(\tilde{h}_k \tilde{h}_k^H W_{\Gamma,r}\right) + \sigma_p^2 + \sigma_n^2}\right)$$

a constraint C2 is rewritten as:

$\widetilde{C2}: (T-\tau) \sum_{k \in \mathcal{K}} \sum_{\Gamma=0}^{1} b_\Gamma Tr(\widetilde{u}^H W_{\Gamma,k}) \leq P_{tot}$, therefore, an optimization problem for a beamforming matrix $W_{\Gamma,k}$ is as follows:

$$\underset{W_{\Gamma,k} \in \mathbb{H}^{N_T}}{\text{maximize}} \ (T-\tau) \sum_{k \in \mathcal{K}} \sum_{\Gamma=0}^{1} \left(a_\Gamma R_k^{0\Gamma} + b_\Gamma R_k^{1\Gamma}\right),$$

$$\text{s.t } C1: (T-\tau) \sum_{k \in \mathcal{K}} \sum_{\Gamma=0}^{1} (a_\Gamma Tr(W_{r,k}) + b_\Gamma Tr(W_{r,k})) \leq P_{max},$$

C6: $W_{\Gamma,k} \succeq 0$, $\forall k$, $\Gamma \in \{0,1\}$, C7: Rank($W_{\Gamma,k}$)≤1, $\forall k$, $\Theta \in \{0, 1\}$, $\mathbb{H}^{N_T}$ indicates a set matrix of $N_T$-dimensional plural Hermite, constraints C6 and C7 ensure that $W_{\Gamma,k}$ is decomposed into $w_{\Gamma,k} w_{\Gamma,k}^H$; in order to ensure that $W_{\Gamma,k}$ can be decomposed into $w_{\Gamma,k}$, it is necessary to ensure $W_{\Gamma,k} \succeq 0$ and Rank($W_{\Gamma,k}$)≤1, constraints C6: $W_{\Gamma,k} \succeq 0$, $\forall k$, $\Gamma \in \{0,1\}$, C7: Rank($W_{\Gamma,k}$)≤1, $\forall k$, $\Gamma \in \{0,1\}$ are defined;

under the influence of the objective function and the constraint C7, the optimization problem is transformed into a convex optimization problem; the optimization problem is processed using a SCA method. For convenience, we define f and g as follows:

$$f(W_{\Gamma,k}, \sigma^2) = -\sum_{k \in \mathcal{K}} \log_2\left(\sum_{r \in \mathcal{K}} Tr\left(\tilde{h}_k \tilde{h}_k^H W_{\Gamma,r}\right) + \sigma^2\right),$$

$$g(W_{\Gamma,k}, \sigma^2) = -\sum_{k \in \mathcal{K}} \log_2\left(\sum_{r \in \mathcal{K} \setminus \{k\}} Tr\left(\tilde{h}_k \tilde{h}_k^H W_{\Gamma,r}\right) + \sigma^2\right),$$

for any feasible $W^{(j)}$, a global lower limit of g(W) is constructed:

$$g(W_{\Gamma,k}, \sigma^2) \geq g(W_{\Gamma,k}^{(j)}, \sigma^2) + \sum_{k \in \mathcal{K}} Tr\left(\left(\nabla_W g(W_{\Gamma,k}^{(j)}, \sigma^2)\right)^H (W_{\Gamma,k} - W_{\Gamma,k}^{(j)})\right) \triangleq \hat{g}(W_{\Gamma,k}, W_{\Gamma,k}^{(j)}, \sigma^2),$$

where $\nabla_{W_k} g(W_{\Gamma,k}, \sigma^2) = -\frac{1}{\ln 2} \frac{\tilde{h}_r \tilde{h}_r^H}{\sum_{r \in \mathcal{K} \setminus \{k\}} Tr\left(\tilde{h}_r \tilde{h}_r^H W_k\right) + \sigma^2}$ therefore, user rates in four cases are as follows:

$$R_k^{00} = f(W_{0,k}, \sigma_n^2) - \hat{g}(W_{0,k}, W_{0,k}^{(j)}, \sigma_n^2)$$

$$R_k^{10} = f(W_{0,k}, \sigma_n^2 + \sigma_p^2) - \hat{g}(W_{0,k}, W_{0,k}^{(j)}, \sigma_n^2 + \sigma_p^2),$$

$$R_k^{01} = f(W_{1,k}, \sigma_n^2) - \hat{g}(W_{1,k}, W_{1,k}^{(j)}, \sigma_n^2)$$

$$R_k^{11} = f(W_{1,k}, \sigma_n^2 + \sigma_p^2) - \hat{g}(W_{1,k}, W_{1,k}^{(j)}, \sigma_n^2 + \sigma_p^2)$$

for any feasible $W_{\Gamma,k}^{(j)}$, $\Gamma \in \{0,1\}$, the optimization problem is transformed into:

$$\underset{W_{0,k}, W_{1,k}}{\text{minimize}} \sum_{\Gamma=0}^{1} \left(a_\Gamma \left(f(W_{\Gamma,k}, \sigma_n^2) - \hat{g}(W_{\Gamma,k}, W_{\Gamma,k}^{(j)}, \sigma_n^2)\right) + b_\Gamma \left(f(W_{\Gamma,k}, \sigma_n^2 + \sigma_p^2) - \hat{g}(W_{\Gamma,k}, W_{\Gamma,k}^{(j)}, \sigma_n^2 + \sigma_p^2)\right)\right), \text{s.t. } C1, \hat{C}2, C6, C7,$$

by employing a SDR, a constraint C7 is removed.

Step S4-2: the diagonal phase-shift matrix $\Phi$ of the IRS in the transmission stage is optimized; an optimization problem is transformed into a convex optimization problem through successive convex optimization and Gaussian randomization, solving is performed by a CVX toolbox, and iterating is performed until the optimization problem converges.

Specifically implemented as follows:

for given $w_{0,k}$ and $w_{1,k}$, a phase design problem of the IRS in the transmission stage is as follows:

$$\underset{\Phi}{\text{maximize}}(T-\tau)\sum_{k\in\mathcal{K}}\sum_{\Gamma=0}^{1}\left(a_\Gamma R_k^{0\Gamma}+b_\Gamma R_k^{1\Gamma}\right)$$

$$\text{s.t } C2: (T-\tau)\sum_{k\in\mathcal{K}}\left(b_0\left|i_d^H w_{0,k}+\right.\right.$$

$$\left.\left.i_r^H \Phi G w_{0,k}\right|^2+b_1\left|i_d^H w_{1,k}+i_r^H \Phi G w_{1,k}\right|^2\right)\leq P_{tol}$$

$$C4: \Phi=\text{diag}\left(e^{j\phi_1},\ldots,e^{j\phi_M}\right)$$

an objective function and a constraint C4 of the optimization problem are non-convex functions, and the objective function is processed as follows:

$$\left|h_k^H w_{\Gamma,r}+h_{R,k}^H \Phi G w_{\Gamma,r}\right|^2 = Tr\left(\begin{bmatrix}\theta^H & \rho^*\end{bmatrix}\begin{bmatrix}\text{diag}(h_{R,k}^H)G \\ h_k^H\end{bmatrix}W_{\Gamma,k}\begin{bmatrix}G_r^H \text{diag}(h_{R,k}^H)h_k^H\end{bmatrix}\begin{bmatrix}\theta \\ \rho\end{bmatrix}\right)$$

$$= Tr\left(\tilde{\theta}^H H_k W_{\Gamma,k} H_k^H \tilde{\theta}\right)$$

$$= Tr\left(\Theta H_k W_{\Gamma,k} H_k^H\right)$$

where optimization variables $\theta\in\mathbb{C}^{M\times 1}$, $\tilde{\theta}\in\mathbb{C}^{(M+1)\times 1}$ and $\Theta\in\mathbb{C}^{(M+1)\times(M+1)}$ are defined as $\theta=[e^{j\phi_1},\ldots,e^{j\phi_M}]^H$, $\tilde{\theta}=[\theta^T\ \rho]^T$, and $\Theta=\tilde{\theta}\tilde{\theta}^H$ respectively; $\rho\in\mathbb{C}$ is a dummy variable and $|\rho|=1$; $H_k=[(\text{diag}(h_{R,k}^H)G)^T h^*_k]^T$; the rate at the k-th user is equivalent to the following form:

$$R_k^{0\Gamma}=\log_2\left(1+\frac{Tr(\Theta H_k W_{\Gamma,k} H_k^H)}{\sum_{r\in\mathcal{K}\setminus\{k\}}Tr(\Theta H_k W_{\Gamma,r}H_k^H)+\sigma_n^2}\right)$$

$$R_k^{0\Gamma}=\log_2\left(1+\frac{Tr(\Theta H_k W_{\Gamma,k} H_k^H)}{\sum_{r\in\mathcal{K}\setminus\{k\}}Tr(\Theta H_k W_{\Gamma,r}H_k^H)+\sigma_p^2+\sigma_n^2}\right)$$

a constraint C2 is transformed into:

$$\tilde{C2}: (T-\tau)\sum_{k\in\mathcal{K}}\sum_{\Gamma=0}^{1}b_\Gamma Tr(\Theta L W_{\Gamma,r}L^H)\leq p_{tol},$$

$$\text{where } L\in\mathbb{C}^{(M+1)\times N_T}, L=\left[(\text{diag}(i_r^H)G)^T\ i_d^*\right]^T$$

for the non-convex objective functions, following definitions are give $$\tilde{f}(\Theta,m,\Gamma)=-\sum_{k\in\mathcal{K}}\log_2\left(\sum_{r\in\mathcal{K}}Tr(\Theta H_k W_{\Gamma,r}H_k^H)+m\sigma_p^2+\sigma_n^2\right),$$

$$\tilde{g}(\Theta,m,\Gamma)=-\sum_{k\in\mathcal{K}}\log_2\left(\sum_{r\in\mathcal{K}\setminus\{k\}}Tr(\Theta H_k W_{\Gamma,r}H_k^H)+m\sigma_p^2+\sigma_n^2\right)$$

therefore, the optimization problem is transformed into:

$$\underset{\Theta\in\mathbb{H}^{M+1}}{\text{minimize}}(T-\tau)\sum_{\Gamma=0}^{1}\left(a_\Gamma(\tilde{f}(\Theta,0,\Gamma)-\tilde{g}(\Theta,0,\Gamma))+\right.$$

$$\left.b_\Gamma(\tilde{f}(\Theta,1,\Gamma)-\tilde{g}(\Theta,1,\Gamma))\right)$$

$$\text{s.t. } \tilde{C2}: (T-\tau)\sum_{k\in\mathcal{K}}\sum_{\Gamma=0}^{1}b_\Gamma Tr(\Theta L W_{\Gamma,k}L^H)\leq p_{tol},$$

$$\tilde{C4}: Diag(\Theta)=I_{M+1}$$

$$C8: \Theta\succeq 0$$

$$C9: \text{Rank}(\Theta)=1$$

where $Diag(\Theta)$ represents a diagonal matrix whose diagonal elements are extracted from a leading diagonal of $\Theta$. $\mathbb{H}^{M+1}$ represents a set matrix of M+1-dimensional plural Hermite, and $I_{M+1}$ represents a M+1-order unit vector. Constraints C8: $\Theta\succeq 0$ and C9: Rank$(\Theta)=1$ are defined; the constraints C8 and C9 and $\Theta\in\mathbb{H}^{M+1}$ jointly ensure that $\Theta=\tilde{\theta}\tilde{\theta}^H$ remain unchanged after being optimized. A rank-one solution is guaranteed by Gaussian randomization.

step S5: the SBS transmits transmission information according to optimization results to achieve an improvement in a spectrum efficiency of a system when constraints interfere with primary users.

Through a BCD optimization method, the phase of the IRS in the perception stage and the phase of the IRS and the SBS's beamforming in the transmission stage are optimized in sequence: the phase of the IRS in the perception stage is first optimized by using a Cauchy inequality, the diagonal phase shift matrix of the IRS in the perception stage and the beamforming vector of the SBS are optimized alternately by use of SCA, SDR and Gaussian randomization, the perception time is optimized by using a one-dimensional search. It is confirmed that the solution proposed in the present invention has higher perception performance and spectrum efficiencies.

Simulation Experiment:

a Matlab language simulation experiment is used, in a simulation, the channel is a Rayleigh channel, the frame duration T is 100 ms, the perception time $\tau$ is 10 ms, the carrier frequency $f_s$ is 6 MHz, the target detection probability $\bar{p}_d$ is 0.9, and a perception network includes 2 SUs. An idle probability of the primary network Pr$(H_0)$ is 0.8, transmit powers at the SBS and the PBS are both set to 30 dBm, a tolerable interference at PUs is set to −90 dBm. A variance of noise at the k-th SU is set to $\sigma_k$=0.01. The number of elements on the IRS is set to M=10.

Figure 3:
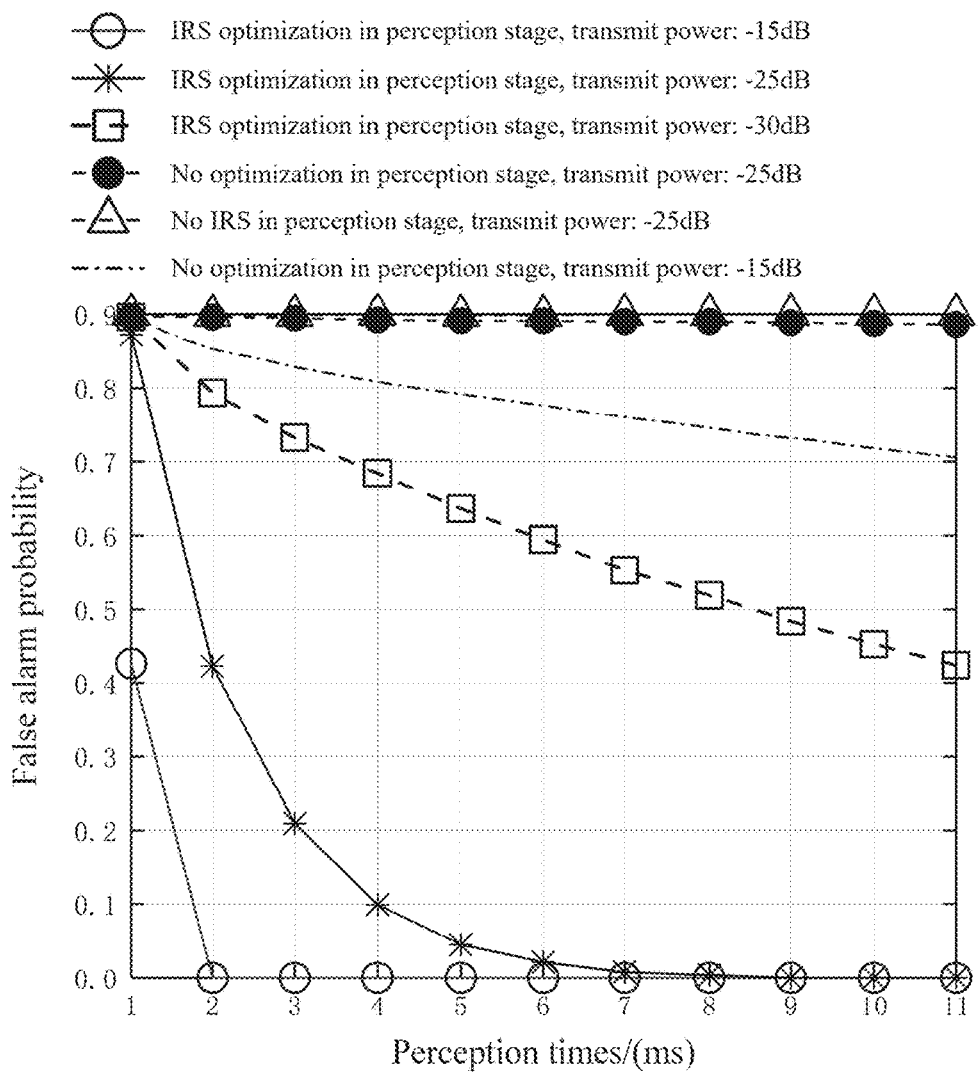
FIG. 3 is a diagram showing a comparison of false alarm probabilities at a SBS at different perception stages and different perception times.

As shown in FIG. 3, at a same transmit power, the false alarm probabilities are gradually reduced in three situations of no IRS in the perception stage, no IRS-based optimization in the perception stage, and IRS-based optimization in the perception stage, and even when the transmit power is low, compared with other solutions, it still has a lower false alarm probability. As can be seen from the figure, the perception performance increases with the increase of the perception time. Therefore, by deploying an IRS to assist in spectrum perception, $P_f$ can converge to 0 in a shorter perception time and at a lower transmit power, so as to facilitate the SBS to formulate different transmit strategies more finely to improve the spectrum efficiency.

Figure 4:
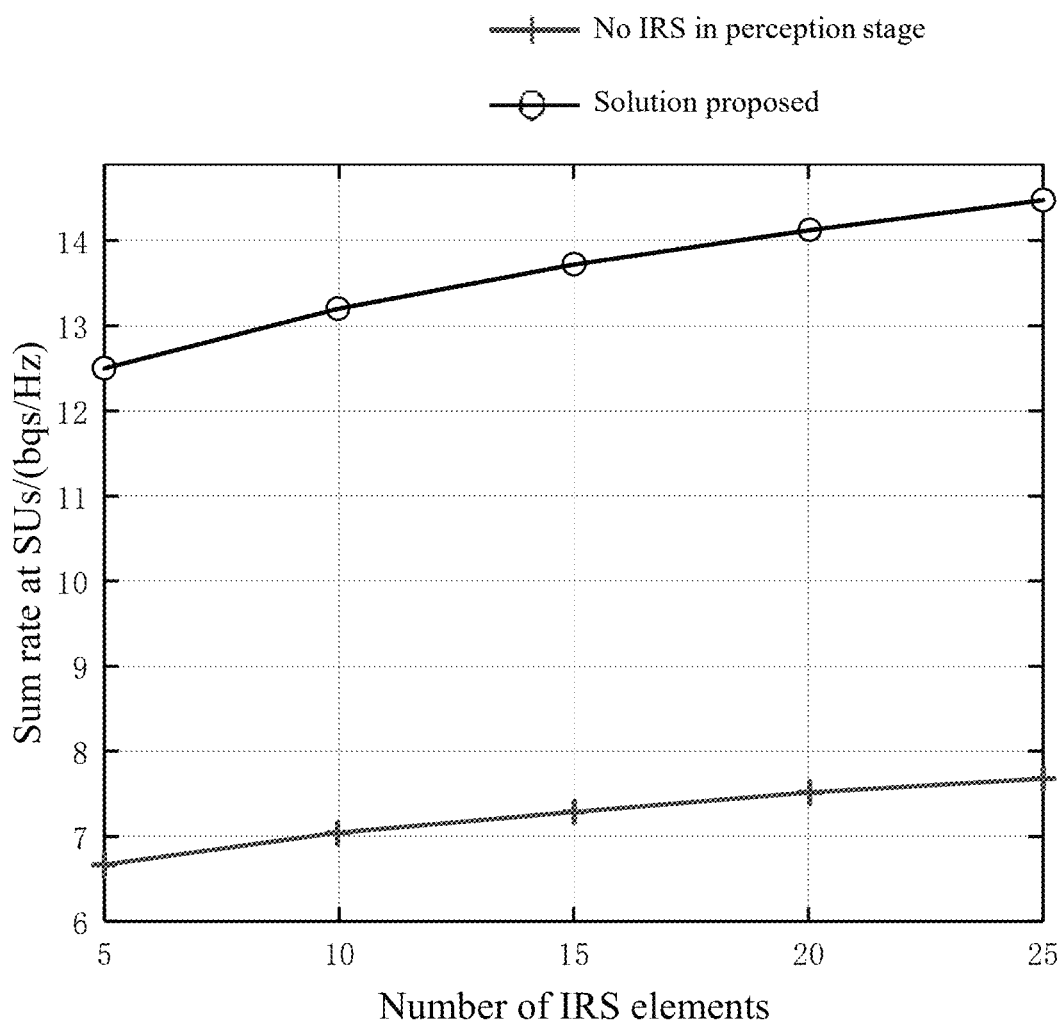
FIG. 4 is a diagram showing a comparison between an IRS-based optimization solution and a non-optimization solution at SUs in the perception stage in the case of different numbers of IRS elements.

As shown in FIG. 4, the relationship between the rate at the SUs and the number of IRS elements is described. It can be seen that with the increase of the number of the IRS, the rate at the SUs increases steadily. On the one hand, more IRS elements provide more flexibility in improving the quality of the user channel, on the other hand, more IRS elements can reflect more signals sent by the BS. Therefore, more IRS elements assisted perception-enhanced spectrum sharing solutions can better improve the communication quality of the SUs.

Figure 5:
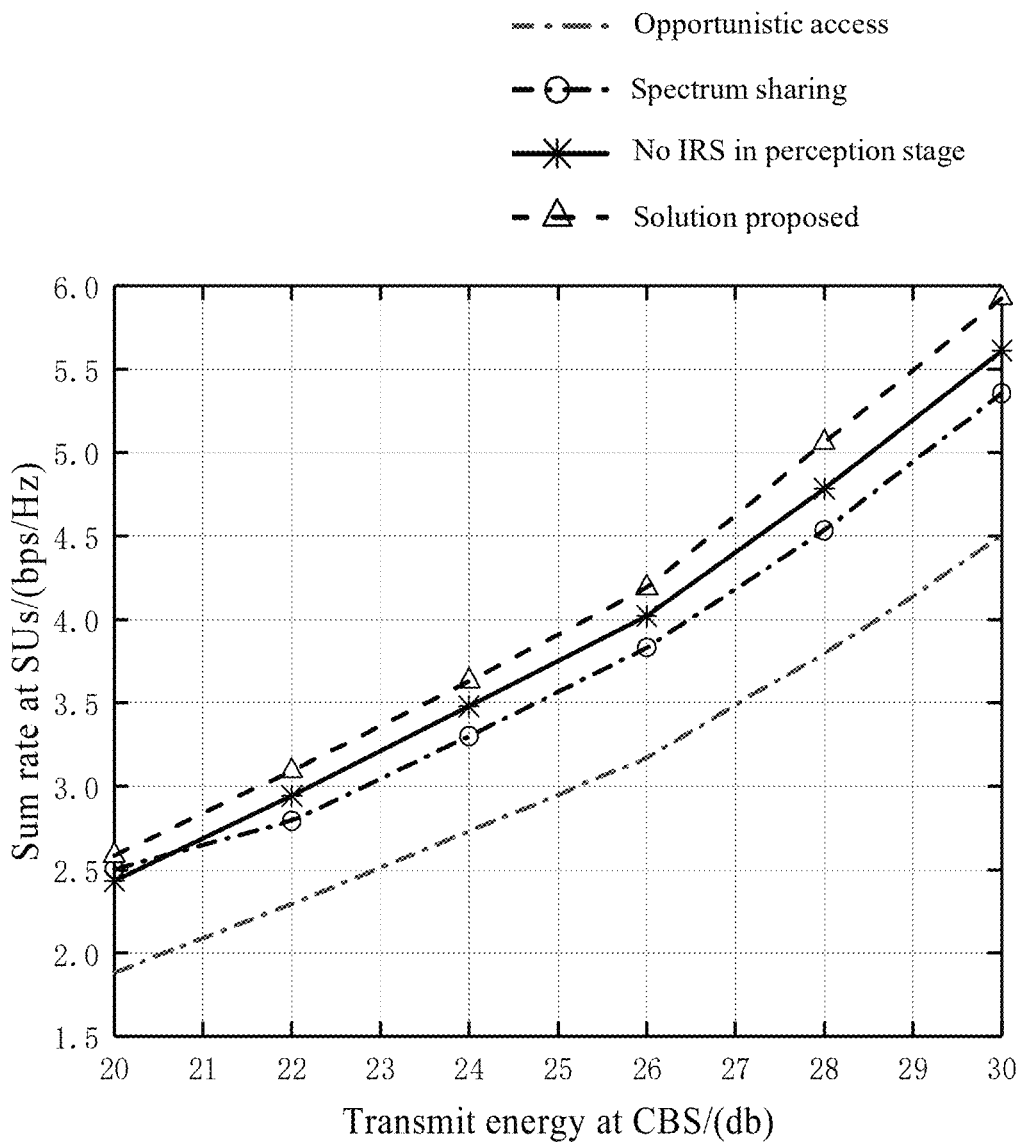
FIG. 5 is a diagram showing a comparison of sum rates of the SUs in various solutions at different transmission powers.

As shown in FIG. 5, a comparison of the sum rates of the SUs in an IRS-assisted CR network at different transmit powers when perception-based spectrum sharing and an opportunistic spectrum access are given. It can be observed that, compared with other solutions, according to the IRS-assisted perception-enhanced spectrum sharing solution proposed by the present invention, the sum rate of the SUs in a secondary network is significantly improved at a same transmit power. In addition, a situation that there is no IRS assistance in the perception stage is added, it can be seen that the solution proposed by the present invention has the highest sum rate.

Figure 6:
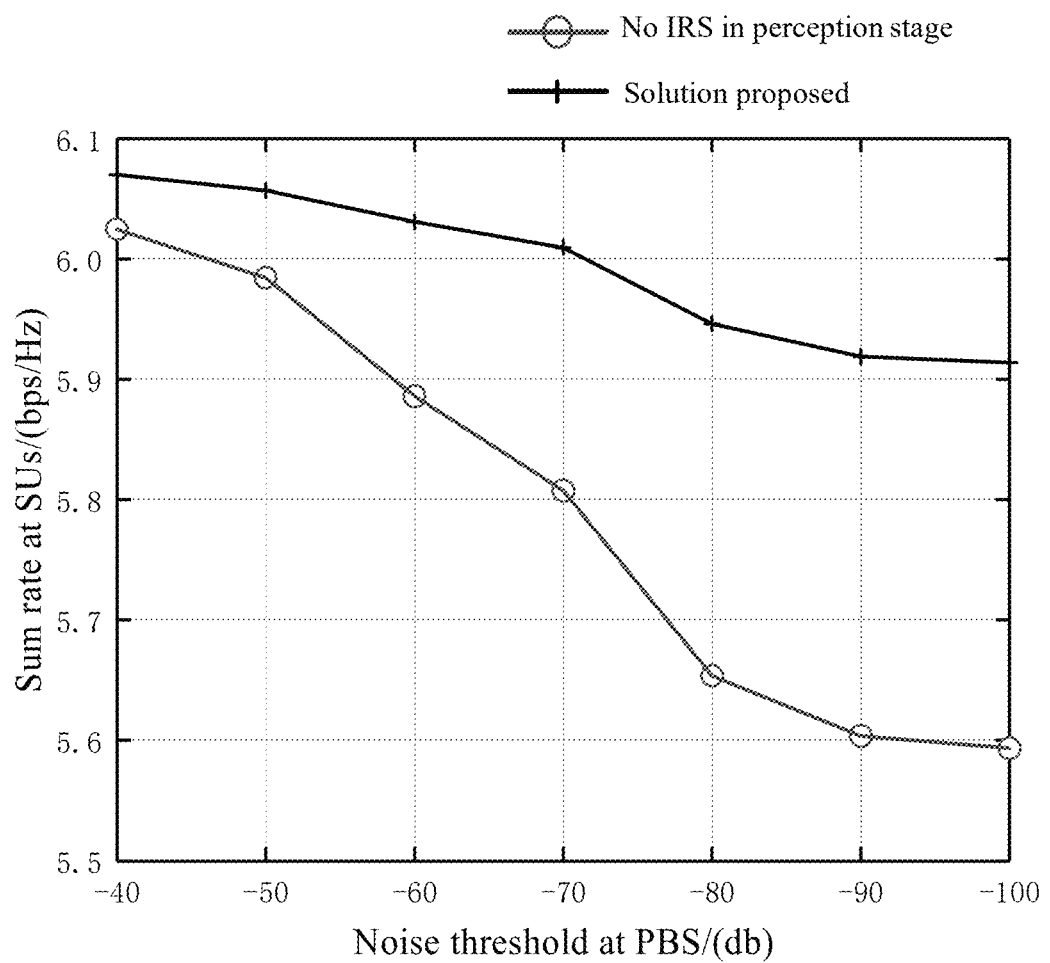
FIG. 6 is a diagram showing a comparison of sum rates of the SUs in different transmit strategies formulated for different spectrum usages and a traditional solution.

As shown in FIG. 6, the mitigation effects caused by the formulation of different transmit strategies for different spectrum usages on the decrease of the sum rate at different primary network noise thresholds are further compared, it can be seen that at a lower noise threshold, the solution proposed by the present invention can still maintain a high sum rate.

The above are merely implementations of the present invention, and are not intended to limit the present invention. For those skilled in the art, various changes and modifications may be made to the present invention. Any modifications, equivalent substitutions, improvements, and the like within the spirit and principles of the present invention shall be included within the scope of the claims of the present invention.

What is claimed is:

1. An optimization method for resource allocation in a perception-enhanced cognitive radio network based on an intelligent reflecting surface (IRS), the method comprising the following steps:

step S1: acquiring, by a secondary base station (SBS), BS (base station)-to-IRS and IRS-to-user channel state information;

step S2: defining diagonal phase-shift matrices of the IRS in a perception stage and a transmission stage, and establishing an optimization model according to the channel state information;

step S3: using the optimization model to optimize that the diagonal phase-shift matrix of the IRS in the perception stage assists the SBS in perceiving a spectrum occupancy of a primary network;

step S4: entering the transmission stage, and using the optimization model to optimize beamforming vectors of the SBS and the diagonal phase-shift matrices of the IRS in the transmission stage in the case of different perception results;

step S5: transmitting, by the SBS, transmission information according to optimization results to achieve an improvement in a spectrum efficiency of a system when constraints interfere with primary users, wherein in the establishing the optimization model in the step S2, an IRS-assisted perception-enhanced cognitive radio (CR) network model is selected as the optimization model;

perfect channel state information is acquired based on the SBS, and an optimization problem of the IRS-assisted perception-enhanced CR network model is expressed as:

$$\underset{w_{0,k}, w_{1,k}, \Phi, \Psi}{\text{maximize}} F(w_{0,k}, w_{1,k}, \Phi, \Psi) \triangleq (T-\tau) \sum_{k \in \mathcal{K}} \sum_{\Gamma=0}^{1} (a_\Gamma R_k^{0\Gamma} + b_\Gamma R_k^{1\Gamma});$$

$$\text{s.t } C1: (T-\tau) \sum_{k \in \mathcal{K}} \sum_{\Gamma=0}^{1} (a_\Gamma + b_\Gamma)(|w_{\Gamma,k}|^2 + |w_{\Gamma,k}|^2) \le P_{max};$$

$$C4: (T-\tau) \sum_{k \in \mathcal{K}} \left( b_0 |i_d^H w_{0,k} + i_r^H \Phi G w_{0,k}|^2 + b_1 |i_d^H w_{1,k} + i_r^H \Phi G w_{1,k}|^2 \right) \le P_{tol},$$

$$C3: P_d = \overline{P}_d,$$

$$C4: \Phi = \text{diag}(e^{j\phi_1}, \ldots, e^{j\phi_M}),$$

$$C5: \Psi = \text{diag}(e^{j\psi_1}, \ldots, e^{j\psi_M}),$$

wherein $P_{max}$ is a maximum transmit power of the SBS; $P_{tol}$ is a maximum interference that can be tolerated by a PU (primary user); $w_{0,k}$ is the SBS's beamforming for a k-th SU (secondary user) when a spectrum is idle; $w_{1,k}$ is the SBS's beamforming for the k-th SU when the spectrum is occupied; T is a duration of one communication frame; $\tau$ is a perception time of the SBS; T−$\tau$ is a SBS-to-SU transmission time in one communication frame; $\mathcal{K}$ is a user set, $\mathcal{K} = \{1, \ldots, K\}$; $\overline{P}_d$ is a constant detection probability; $i_d$ is a SUs-to-PU equivalent matrix; $i_r$ is an IRS-to-PU equivalent matrix; C1 is a total power constraint of the SBS, C2 limits an upper limit of interference received by PUs, C3 is a target detection probability constraint, C4 is a constraint of the diagonal phase-shift matrix of the IRS in the perception stage on the IRS, C5 is a constraint of the diagonal phase-shift matrix of the IRS in the transmission stage on the IRS.

2. The optimization method for resource allocation in the perception-enhanced cognitive radio network based on the IRS according to claim 1, wherein the defining diagonal phase-shift matrices of the IRS in the perception stage and the transmission stage in the step S2 is specifically implemented as follows:

letting a reflection coefficient of the IRS in the perception stage be $\psi = [\psi_1, \ldots, \psi_M]^T \in \mathbb{C}^{M \times 1}$, $\psi_m = \alpha_m e^{j\omega_m}$, wherein $\alpha_m$, $\omega_m \in [0, 2\pi]$ is divided into a magnitude and a phase of a m-th element in the IRS, the diagonal phase-shift matrix of the IRS in the perception stage is $\Psi = \text{diag}(\psi)$, a diag(x) function is defined to create a diagonal matrix whose diagonal elements are elements in x, and $\mathbb{C}^{M \times 1}$ represents a complex valued vector with a length of M+1;

letting a reflection coefficient of the IRS in the transmission stage be $\phi=[\phi_1, \ldots, \phi_M]^T \in \mathbb{C}^{M\times 1}$, $\phi_m = \beta_m e^{j\theta_m}$, wherein $\beta_m, \theta_m \in [0, 2\pi]$ is divided into a magnitude and a phase of the m-th element in the IRS; and the diagonal phase-shift matrix of the IRS in the transmission stage is $\Phi = \text{diag}(\phi)$.

3. The optimization method for resource allocation in the perception-enhanced cognitive radio network based on the IRS according to claim 1, the using the optimization model to optimize that the diagonal phase-shift matrix of the IRS in the perception stage assists the SBS in perceiving the spectrum occupancy of the primary network in the step S3 is specifically implemented as follows:

the diagonal phase-shift matrix of the IRS in the perception stage is $\Psi$, and an objective function and constraint conditions related to $\Psi$ are as follows:

$$\underset{\Psi}{\text{maximize}}(T-\tau)\sum_{k\in\mathcal{K}}\sum_{\Gamma=0}^{1}(a_\Gamma R_k^{0\Gamma} + b_\Gamma R_k^{1\Gamma});$$

$$\text{s.t } C1: (T-\tau)\sum_{k\in\mathcal{K}}\sum_{\Gamma=0}^{1}(a_\Gamma + b_\Gamma)(|w_{\Gamma,k}|^2 + |w_{\Gamma,k}|^2) \le P_{max};$$

$$C5: \Psi = \text{diag}(e^{j\psi_1}, \ldots, e^{j\psi_M});$$

wherein an actual state of a $a_\Gamma R_k^{0\Gamma}$ rate is an idle state, an actual state of a $b_\Gamma R_k^{1\Gamma}$ rate is an occupied state; $w_{\Gamma,k}$ is the SBS's beamforming for the k-th SU when the spectrum is idle or occupied;

in the above formula, a part related to the $\Psi$ in the objective function is $a_0 R_k^{00} + a_1 R_k^{01}$; maximization of the objective function is to maximize $a_0 R_k^{00} + a_1 R_k^{01}$, which is specifically as follows:

$$a_0 R_k^{00} + a_1 R_k^{01} = Pr(H_0)(1 - P_f(\tau, \Psi))R_k^{00} + Pr(H_0)P_f(\tau, \Psi)R_k^{01}$$
$$= Pr(H_0)(R_k^{00} + P_f(\tau, \Psi)(R_k^{01} - R_k^{00}));$$

$P_f(\tau, \Psi)$ is a monotonically decreasing function of $\gamma(\Psi)$, an optimization objective can be transformed into:

$$\underset{\Psi}{\text{maximize}}\gamma(\Psi);$$

$$\text{s.t } C1, C5$$

$$\gamma(\Psi) = \frac{|g_{CD}^H w_{PB} + g_{CR}^H \Psi G_{PC} w_{PB}|^2}{\sigma_n^2};$$

wherein $\gamma$ is a signal-to-noise ratio received from a PBS (primary base station) signal at the SBS in the perception stage; $g_{CR}$ and $G_{PC}$ are IRS-to-SBS and PBS-to-IRS equivalent matrices, respectively; $g_{CD}$ is a PBS-to-SBS direct link, $\sigma_n^2$ represents a variance of additive white Gaussian noise, $w_{PB}$ is a beamforming vector of the PBS;

the objective function is non-convex, and its closed-form solution is obtained using its special structure; and a following inequality is constructed:

$$|g_{CD}^H w_{PB} + g_{CR}^H \Psi G_{PC} w_{PB}| \overset{(a)}{\le} |g_{CR}^H \Psi G_{PC} w_{PB}| + |g_{CD}^H w_{PB}|;$$

(a) is a triangle inequality established only when $\arg(g_{CR}^H \Psi G_{PC} w_{PB}) = \arg(g_{CD}^H w_{PB}) \triangleq \varphi_0$; it is proved that there is always a solution $\psi$ satisfying (a) and the constraint C5;

let $g_{CR}^H \Psi G_{PC} w_{PB} = v^H a$, $v = [e^{j\psi_1}, \ldots, e^{j\psi_M}]^H$, $a = \text{diag}(g_{CR}^H)G_{PC} w_{PB}$;

a formula $$\underset{\Psi}{\text{maximize}} \gamma(\Psi)$$

$$\text{s.t. } C1, C5$$

is made to be equivalent to:

$$\text{maximize } |v^H a|^2$$

$$\text{s.t. } |v_n| = 1, \forall n = 1, \ldots M;$$

$$\arg(v^H a) = \varphi_0$$

$v_n$ is a n-th element in v;

its optimal solution is $v^* = e^{j(\varphi_0 - \arg(a))} = e^{j(\varphi_0 - \arg(\text{diag}(g_{CR}^H)G_{PC} w_{PB}))}$, an n-th optimized phase of the IRS is:

$$\psi_n^* = \varphi_0 - \arg(g_{n,CR}^H g_n^H w_{PB});$$

wherein $g_{n,CR}^H$ is an n-th element of $g_{CR}^H$, $g_n^H$ is a vector in an n-th row of $G_{PC}$; the optimization of the phase $\Psi$ of the IRS in the perception stage is completed.

4. The optimization method for resource allocation in the perception-enhanced cognitive radio network based on the IRS according to claim 1, wherein the entering the transmission stage, and using the optimization model to optimize beamforming vectors of the SBS and the diagonal phase-shift matrix $\Phi$ of the IRS in the transmission stage in the case of different perception results in the step S4 is specifically implemented as follows:

step S4-1: optimizing the beamforming vectors of the SBS; obtaining an optimal solution of the beamforming vectors of the SBS through successive convex optimization and positive semi-definite programming;

step S4-2: optimizing the diagonal phase-shift matrix $\Phi$ of the IRS in the transmission stage; and transforming an optimization problem into a convex optimization problem through successive convex optimization and Gaussian randomization, performing solving by a convex optimization (CVX) toolbox, and iterating until the optimization problem converges.

5. The optimization method for resource allocation in the perception-enhanced cognitive radio network based on the IRS according to claim 4, wherein the optimizing the beamforming vectors of the SBS in the step S4-1 is specifically implemented as follows:

defining $W_{\Gamma,k}=w_{\Gamma,k}w_{\Gamma,k}^H$, and for a given $\Phi$, expressing an optimization problem for a beamforming matrix $W_{\Gamma,k}$ as follows:

$$\underset{w_{\Gamma,k}\in\mathbb{H}^{N_T}}{\text{maximize}}(T-\tau)\sum_{k\in K}\sum_{\Gamma=0}^{1}(a_\Gamma R_k^{0\Gamma}+b_\Gamma R_k^{1\Gamma});$$

$$\text{s.t } C1: (T-\tau)\sum_{k\in K}\sum_{\Gamma=0}^{1}(a_\Gamma Tr(W_{\Gamma,k})+b_\Gamma Tr(W_{\Gamma,k}))\le P_{max};$$

$$C6: W_{\Gamma,k}\succeq 0, \forall k, \Gamma\in\{0,1\};$$

$$C7: \text{Rank}(W_{\Gamma,k})\le 1, \forall k, \Gamma\in\{0,1\};$$

$\mathbb{H}^{N_T}$ indicates a set matrix of $N_T$-dimensional plural Hermite, constraints C6 and C7 ensure that $W_{\Gamma,k}$ is decomposed into $w_{\Gamma,k}w_{\Gamma,k}^H$; in order to ensure that $W_{\Gamma,k}$ can be decomposed into $w_{\Gamma,k}$, it is necessary to ensure $W_{\Gamma,k}\succeq 0$ and $\text{Rank}(W_{\Gamma,k})\le 1$, constraints C6: $W_{\Gamma,k}\succeq 0$, $\forall k, \Gamma\in\{0,1\}$, C7: $\text{Rank}(W_{\Gamma,k})\le 1$, $\forall k, \Gamma\in\{0,1\}$ are defined; under the influence of the objective function and the constraint C7, transforming the optimization problem into a convex optimization problem; defining f and g as follows:

$$f(W_{\Gamma,k},\sigma^2)=-\sum_{k\in K}\log_2\left(\sum_{r\in K}Tr(\tilde{h}_k\tilde{h}_k^H W_{\Gamma,r})+\sigma^2\right);$$

$$g(W_{\Gamma,k},\sigma^2)=-\sum_{k\in K}\log_2\left(\sum_{r\in K\setminus\{k\}}Tr(\tilde{h}_k\tilde{h}_k^H W_{\Gamma,r})+\sigma^2\right);$$

wherein $\mathcal{K}\setminus\{k\}$ represents a set of $\mathcal{K}$ in which an element k is removed;

for any feasible $W^{(j)}$, constructing a global lower limit of $g(W)$:

$$g(W_{\Gamma,k},\sigma^2)\ge g(W_{\Gamma,k}^{(j)},\sigma^2)+$$

$$\sum_{k\in K}Tr\left((\nabla_W g(W_{\Gamma,k}^{(j)},\sigma^2))^H(W_{\Gamma,k}-W_{\Gamma,k}^{(j)})\right)\triangleq\Delta\hat{g}(W_{\Gamma,k},W_{\Gamma,k}^{(j)},\sigma^2);$$

wherein $\nabla_{W_k}g(W_{\Gamma,k},\sigma^2)=-\frac{1}{\ln 2}\frac{\tilde{h}_r\tilde{h}_r^H}{\Sigma_{r\in K\setminus\{k\}}Tr(\tilde{h}_r\tilde{h}_r^H W_k)+\sigma^2};$ for any feasible $W_{\Gamma,k}^{(j)}$, $\Gamma\in\{0,1\}$, transforming the optimization problem into:

$$\underset{W_{0,k},W_{1,k}}{\text{minimize}}\sum_{\Gamma=0}^{1}(a_\Gamma(f(W_{\Gamma,k},\sigma_n^2)-\hat{g}(W_{\Gamma,k},W_{\Gamma,k}^{(j)},\sigma_n^2))+$$

$$b_\Gamma(f(W_{\Gamma,k},\sigma_n^2+\sigma_p^2)-\hat{g}(W_{\Gamma,k},W_{\Gamma,k}^{(j)},\sigma_n^2+\sigma_p^2)));$$

s.t. $C1, \widetilde{C2}, C6, C7$.

6. The optimization method for resource allocation in the perception-enhanced cognitive radio network based on the IRS according to claim 5, wherein the optimizing the diagonal phase-shift matrix $\Phi$ of the IRS in the transmission stage in the step S4-2 is specifically implemented as follows:

for given $w_{0,k}$ and $w_{1,k}$, a phase design problem of the IRS in the transmission stage is as follows:

$$\underset{\Phi}{\text{maximize}}(T-\tau)\sum_{k\in K}\sum_{\Gamma=0}^{1}(a_\Gamma R_k^{0\Gamma}+b_\Gamma R_k^{1\Gamma}),$$

-continued $$\text{s.t } C2: (T-\tau)\sum_{k\in K}\left(b_0\left|i_d^H w_{0,k}+i_r^H\Phi G w_{0,k}\right|^2+\right.$$

$$\left.b_1\left|i_d^H w_{1,k}+i_r^H\Phi G w_{1,k}\right|^2\right)\le P_{tol},$$

$$C4: \Phi=\text{diag}(e^{j\phi_1},\ldots,e^{j\phi_M}),$$

the objective function and a constraint C4 of the optimization problem are non-convex functions, and the objective function is processed:

$$\left|h_k^H w_{\Gamma,k}+h_{R,k}^H\Phi G w_{\Gamma,k}\right|^2=$$

$$Tr\left([\theta^H\ \rho^*]\begin{bmatrix}\text{diag}(h_{R,k}^H)G\\h_k^H\end{bmatrix}W_{\Gamma,k}[G^H\text{diag}(h_{R,k}^H)h_k^H]\begin{bmatrix}\theta\\\rho\end{bmatrix}\right)=$$

$$Tr(\tilde{\theta}^H H_k W_{\Gamma,k}H_k^H\tilde{\theta})=Tr(\Theta H_k W_{\Gamma,k}H_k^H),$$

wherein optimization variables $\theta\in\mathbb{C}^{M\times 1}$, $\tilde{\theta}\in\mathbb{C}^{(M+1)\times 1}$ and $\Theta\in\mathbb{C}^{(M+1)\times(M+1)}$ are respectively defined as:

$$\theta=[e^{j\phi_1},\ldots,e^{j\phi_M}]^H,$$

$$\tilde{\theta}=[\theta^T\ \rho]^T,$$

$$\Theta=\tilde{\theta}\tilde{\theta}^H,$$

wherein $\rho\in\mathbb{C}$ is a dummy variable and $|\rho|=1$, $H_k=[(\text{diag}(h_{R,k}^H)G)^T h_k^*]^T$; a rate at a k-th user is equivalent to the following form:

$$R_k^{0\Gamma}=\log_2\left(1+\frac{Tr(\Theta H_k W_{\Gamma,k}H_k^H)}{\Sigma_{r\in K\setminus\{k\}}Tr(\Theta H_k W_{\Gamma,k}H_k^H)+\sigma_n^2}\right);$$

$$R_k^{0\Gamma}=\log_2\left(1+\frac{Tr(\Theta H_k W_{\Gamma,k}H_k^H)}{\Sigma_{r\in K\setminus\{k\}}Tr(\Theta H_k W_{\Gamma,r}H_k^H)+\sigma_p^2+\sigma_n^2}\right);$$

the constraint C2 is transformed into:

$$\widetilde{C2}: (T-\tau)\sum_{k\in K}\sum_{\Gamma=0}^{1}b_\Gamma Tr(\Theta L W_{\Gamma,r}L^H)\le p_{tol};$$

wherein $L\in\mathbb{C}^{(M+1)\times N_T}$, $L=[(\text{diag}(i_r^H)G)^T i_d^*]^T$;

for the non-convex objective functions, following definitions are given:

$$\tilde{f}(\Theta,m,\Gamma)=-\sum_{k\in K}\log_2\left(\sum_{r\in K}Tr(\Theta H_k W_{\Gamma,r}H_k^H)+m\sigma_p^2+\sigma_n^2\right);$$

$$\tilde{g}(\Theta,m,\Gamma)=-\Sigma_{k\in K}\log_2\left(\Sigma_{r\in K\setminus\{k\}}Tr(\Theta H_k W_{\Gamma,r}H_k^H)+m\sigma_p^2+\sigma_n^2\right);$$

therefore, the optimization problem is transformed into:

$$\underset{\Theta\in\mathbb{H}^{M+1}}{\text{minimize}}(T-\tau)\sum_{\Gamma=0}^{1}(a_\Gamma(\tilde{f}(\Theta,0,\Gamma)-\tilde{g}(\Theta,0,\Gamma))+$$

$$b_\Gamma(\tilde{f}(\Theta,1,\Gamma)-\tilde{g}(\Theta,1,\Gamma)));$$

$$\text{s.t. } \widetilde{C2}: (T-\tau)\sum_{k\in K}\sum_{\Gamma=0}^{1}b_\Gamma Tr(\Theta L W_{\Gamma,k}L^H)\le p_{tol};$$

-continued $\widetilde{C4}: \text{Diag}(\Theta) = I_{M+1};$ $C8: \Theta \succeq 0;$ $C9: \text{Rank}(\Theta) = 1;$ wherein $\text{Diag}(\Theta)$ represents a diagonal matrix whose diagonal elements are extracted from a leading diagonal of $\Theta$; $I_{M+1}$ represents a M+1-order unit vector, constraints C8: $\Theta \succeq 0$ C9: $\text{Rank}(\Theta)=1$ are defined; the constraints C8 and C9 and $\Theta \in ^{M+1}$ jointly ensure that $\Theta = \tilde{\theta}\tilde{\theta}^H$ remain unchanged after being optimized; a rank-one solution is guaranteed using Gaussian randomization.

\* \* \* \* \*